Patented Feb. 11, 1936

2,030,082

UNITED STATES PATENT OFFICE 2,030,082

MAKING POTASH

Erich Wiedbrauck and Karl Büche, Essen-Ruhr, Germany, assignors to the firm of Th. Goldschmit A.-G., Essen-Ruhr, Germany No Drawing. Application April 13, 1932, Serial No. 605,117. In Germany April 20, 1931

14 Claims. (Cl. 23—63)

This invention relates to making potash; and it comprises a process utilizing potassium sulfate and materials containing the same for the production of potassium carbonate, wherein potassium sulfate in solution and in the presence of a sufficient amount of lime to correspond to the sulfuric acid present is treated with a gas containing, or consisting of CO, until the potassium sulfate is converted substantially comtpletely into calcium sulfate and potassium formate, the potassium formate being ordinarily recovered and converted into potassium carbonate by calcination, ordinarily in the presence of preformed potassium carbonate, all as more fully hereinafter set forth and as claimed.

While it is relatively easy to produce soda as the carbonate or bicarbonate from sodium sulfate or chlorid by well known processes, it is difficult to produce potassium carbonate in any easy or economical way from either potassium chlorid or sulfate. For various reasons, potassium sulfate cannot be put through the Le Blanc process as can sodium sulfate, nor can potassium chlorid be treated by the Solvay process in the same manner as sodium chlorid.

In the present invention there is provided a simple, easy and economical method of converting potassium sulfate into potassium carbonate with potassium formate as an intermediate stage and calcium sulfate as a by-product. In making the formate, the CO of producer gas or water gas is utilized. The conversion of potassium sulfate to potassium carbonate in this manner requires no other raw materials than lime, carbon monoxide and air.

In most prior processes looking toward the conversion of potassium sulfate into carbonate, furnacing operations have been involved. The present invention works with aqueous solutions and suspensions. The only furnacing necessary is that in oxidizing potassium formate to produce carbonate.

As is well known, CO is readily taken up by caustic alkali solutions with conversion into formate. The reaction is readily conducted and the results are quantitative. Relatively weak gases containing CO, such as producer gas or other gas, can be used; and, in fact, the reaction can be made to serve in removing CO from hydrogen. The reaction, however, in spite of many futile efforts, cannot be satisfactorily carried out with lime, the tendency being to produce calcium carbonate and hydrogen, rather than calcium formate.

The present invention is based on the fact that a suspension of lime in a solution of potassium sulfate acts, so far as making formate is concerned, like a solution of caustic potash.

Quantitative yields of potassium formate can be readily made even with the use of gases weak in CO. When a CO-containing gas is passed through a suspension of lime in potassium sulfate solution, the lime is converted into calcium sulfate with formation of potassium formate solution. If the lime is present in the proper amount, the reaction is quantitative. The calcium sulfate can be filtered off and the potassium formate solution evaporated and the formate calcined or otherwise treated. Sometimes, when market conditions justify, the formate can be sold as such, or formic acid be produced with the aid of sulfuric acid with re-formation of potassium sulfate which can be again treated for the production of potassium formate.

Any suitable industrial gas containing CO may be employed but ordinary producer gas is generally used. It should be as free of $CO_2$ as convenient. Water gas containing, usually, about 45 per cent CO and about 45 per cent $H_2$ is a suitable gas for the present purposes and gives hydrogen as a by-product. Water gas is richer in CO than ordinary producer gas made by air blowing coke, etc., and is, to that extent, easier to handle.

Dry potassium formate exposed to heat undergoes a variety of reactions with internal rearrangement; the particular products of reaction depending on circumstances. On heating, with a careful control of all conditions, including absence of air, it is possible to convert it, nearly quantitatively, into potassium oxalate with evolution and escape of hydrogen. Without careful control of conditions and on heating in air, the reactions become quite irregular. Hydrogen may be formed and burned, but a frequent phenomenon is the production of free carbon; soot-like carbon being formed in the mass. The ultimate result of calcination in the presence of air is oxidation to potassium carbonate but it is difficult to obtain a quantitative yield of pure $K_2CO_3$. In calcining, the development and combustion of hydrogen or of carbon, or of both, readily cause local high temperatures with loss of materials. In calcining and oxidizing potassium formate in a current of air or flame considerable care is necessary in effecting a smooth conversion with production of a pure, white product. An expedient which makes it considerably easier to secure a smooth conversion is to calcine the formate in admixture with preformed potassium carbonate. Solid potassium formate, usually coming from a later operation, may be physically mixed with dry, powdered potassium formate. Or, potassium carbonate may be dissolved in the liquor containing potassium formate prior to the production of dry formate. This procedure has certain practical advantages; the liquor being purified thereby. There is not a loss in these uses of potassium carbonate; potassium carbonate produced in the operation itself being, to some extent, recycled.

In a specific embodiment of the present invention, a solution of potassium sulfate carrying lime in suspension is treated with purified producer gas in a steel pressure vessel provided with a stirrer, at about 200° C. and at a gage pressure of about 15 atmospheres. A batch containing 300 kilograms potassium sulfate and 120 kilograms quicklime is convenient, enough water being used to give, finally, a potassium formate solution of about 27 per cent concentration.

Introduction of gas containing CO is continued, waste gas being vented, until absorption of CO slackens substantially. The batch is then cooled and the sulfate of calcium formed in reaction is filtered off, the filtrate and washings being then evaporated.

A typical liquor formed in the way described, on analysis, showed 148 grams per liter of combined formic acid, equivalent to 270 grams per liter of potassium formate. The liquor also contained 18 grams per liter of residual potassium sulfate and 5 grams of lime, together with traces of iron oxid and alumina. The liquor was filtered and the calcium sulfate cake washed, the washings being added to the filtrate. The washed calcium sulfate formed a valuable by-product. In the particular operation now under description, the filtrate and washings were heated to about 90° C. by steam blown in and solid potassium carbonate from a later stage in the operation was added and dissolved. It is sometimes convenient to add the potash as a solution, but this increases the dilution. In this particular operation there was added for each liter of original liquor of the stated composition potassium carbonate in the amount of 18.5 grams. The addition of potassium carbonate precipitated about 8.8 grams of calcium carbonate (dry weight) per liter of original liquor, the calcium carbonate carrying down with it some iron oxid and alumina, thereby purifying the potassium formate solution to this extent. In this operation, the calcium carbonate precipitate was filtered off, the liquid being maintained warm, and a potassium formate solution obtained as a filtrate, the solution containing about 27 per cent potassium formate. Some potassium sulfate was still present. The solution was evaporated down in an ordinary multiple effect apparatus, evaporation being carried as far as possible. Either vacuum or pressure multiple effects are here applicable. It was found that by continuing the evaporation until the liquor reaches 140° C. at 760 mm. pressure, a concentrated potassium formate solution was obtained corresponding to about 1100 grams formic acid per liter. From this solution potassium sulfate separated nearly quantitatively. In this particular work, of the 18 grams potassium sulfate contained in a liter of original liquor, 17.4 grams were here separated. The separated potassium sulfate was recycled, being used in the first step of a subsequent operation.

The residual water in the concentrated potassium formate solution just described can be removed by further heating, either at atmospheric pressure or in vacuo. In this instance the solution was heated to 210° C. at atmospheric pressure and the water content reduced to 3.5 per cent $H_2O$, giving a practically dry product suitable for the next step of operation. Sometimes water is removed by allowing the hot concentrated formate solution to trickle down an ordinary tower in countercurrent to hot gases; such as the waste gases of the calcining operation described. This use of these gases contributes to economy. In handling the hot concentrated liquor to remove residual water, it is advisable to use structural materials withstanding alkali and heat, such as, for instance, cast iron containing nickel, chrome-iron steels and so on.

The dry hot potassium formate produced as described, in this particular operation, was next mixed with nearly its own weight of dry, fine-ground potassium carbonate. The addition corresponded to about 0.8 kilograms dry potassium carbonate for each kilogram of 96-97 per cent potassium formate. The mixture was then calcined in an open hearth furnace, heated by a direct flame. The hydrogen and carbon separating from the formate burned directly and, to aid in this and in the heating, the mass was stirred from time to time. After the temperature in the furnace reached 700-750° C., the charge was allowed to remain at this temperature for 30 to 60 minutes and then drawn, making room for another charge. No loss of potassium was experienced in the calcination. The drawn charge after cooling and grinding, gave a very pure, white and completely soluble potash, showing on analysis 99.5 per cent potassium carbonate, 0.15 per cent potassium sulfate, 0.02 per cent potassium chlorid and 0.008 per cent insolubles.

In lieu of the described batch operation in calcining, it is possible to calcine in continuous operation and this has the advantage that only small portions of the material are exposed to the high heat at any one time and violent and irregular decomposition reactions are easier to avoid; and in particular, those side reactions which result in a separation of carbon. With this continuous method of operation, handling small successive portions, the use of potassium carbonate in modifying the reaction is less important than it is in dealing with large batches; but it is highly advantageous. An addition of potassium carbonate in substantial amounts has the stated advantage that the mixture is pasty and readily handled at temperatures where potassium formate itself would be liquid. In continuous operation, the heat economy and control is easier. Continuous calcination may be effected in any of the ordinary types of apparatus, such as rotating drums with interior or exterior heating. Rotating kilns and direct firing are suitable, the flame gases either going in countercurrent or in the same direction as the traveling material calcined. On the whole, concurrent operation is better, as avoiding baking and formation of lumps in the kiln and giving good heat economy. However, stirring devices can be used. It is particularly desirable that the material be heated as quickly as possible to the decomposition temperature and remain in a liquid condition for as short a time as possible. Potassium formate melts at a low temperature, while potassium carbonate is infusible at the temperatures mentioned, the melting point being 878° C. By adding solid recycled potassium carbonate a pasty consistency is given to the potassium formate to be calcined and this greatly facilitates heating. Without the potassium carbonate, the mass is apt to vesiculate or rise by the vigorous evolution of hydrogen and become contaminated by extremely finely divided carbon. In the presence of carbon it is difficult to obtain a pure white calcined product. Quiet and ready operation in calcining is secured by the addition of recycled potassium carbonate; about 1 part of carbonate for 3 parts of formate sufficing. With the added potassium carbonate, it is not difficult to burn out all contained carbon at about 700° C. and make a pure white calcined product.

While in the above processes the use of commercial potassium sulfate is described, it is also possible to recover potash from potassium sulfate contained in cheaper materials. Certain complex, naturally occurring salts or the complex salts produced in various processes, which contain potassium sulfate can be used. Examples of these complex salts are syngenite

$$(5CaSO_4 \cdot K_2SO_4 \cdot H_2O)$$

and polyhalite $(K_2SO_4 \cdot MgSO_4 \cdot 2CaSO_4 \cdot 2H_2O)$. As an example of such an operation, 540 parts by weight of polyhalite were taken, having an analysis of 58.95 per cent $CaSO_4$; 15 per cent $MgSO_4$; 16.15 per cent $K_2SO_4$; 1.32 per cent KCl and a residue of water. This polyhalite was mixed with 93.4 parts of calcium oxid in 757 parts of water. This mixture was agitated at a temperature of 175° C. for 7 hours while passing carbon monoxid through the mixture. A gage pressure of 20 atmospheres was maintained. The reaction products consisted of a solution of potassium formate and a precipitate of calcium sulfate containing some potassium sulfate.

After the described production of a liquor containing potassium formate and a precipitate of calcium sulfate is produced, the purity of the liquor can be enhanced by an expedient described and claimed in copending application Serial No. 605,116; this expedient consists in raising the temperature and pressure for a time. The precipitated calcium sulfate recovered as above, carries down with it some potassium sulfate, in a form which may be termed a complex salt or may be occluded or adsorbed, according to circumstances. This effect may be regarded as due to the formation of double salts. In any event, by cutting off the introduction of CO and raising the temperature to about 200°–250° C. at a pressure of about 30 atmospheres and holding the mixture for about 60 minutes under these conditions, a much cleaner separation of calcium sulfate is obtained. For example, when the above reaction products were treated in this manner the calcium sulfate separated upon filtration contained only 0.8 per cent of $K_2O$. Without this superheating operation, there is always some loss of potassium sulfate in the calcium sulfate. Adoption of this expedient materially lessens the amount of wash water necessary for efficient operation.

In the specific operation described ante, the purified potassium formate solution was evaporated and dried as a whole. However, sometimes, in lieu of doing this, potassium formate is crystallized out of a concentrated thick liquor; the liquor produced as described where concentration is carried far enough to crystallize out residual potassium sulfate. The potassium formate crystals so produced are drained and purified in a centrifugal and are then ready for the further steps in the process.

What is claimed is:

1. A process of converting potassium sulfate into potassium carbonate which comprises dissolving potassium sulfate in water, adding lime, gassing the mixture with CO until the absorption of CO slackens, separating the solution of potassium formate from the insoluble calcium sulfate produced, evaporating the solution to dryness and calcining under oxidizing conditions to convert the potassium formate to potassium carbonate.

2. The process of claim 13 wherein the gas employed is pure CO.

3. The process of claim 13 wherein the gas employed is water gas.

4. The process of claim 13 wherein the gas employed is producer gas.

5. In the process of claim 1, the improvement which comprises purifying the formate solution by an addition of potassium carbonate and filtration prior to evaporating.

6. The process of claim 1 wherein the dry formate is calcined in the presence of sufficient pre-formed potassium carbonate to render the mixture pasty on heating.

7. The process of claim 13 wherein the potassium sulfate is in the form of a complex sulfate containing potassium sulfate.

8. The process of claim 13 wherein the potassium sulfate is in the form of polyhalite.

9. In the utilization of potassium sulfate and natural materials containing the same, the process which comprises reacting upon potassium sulfate and an amount of lime corresponding thereto with CO and water under pressure and at a high temperature, removing the calcium sulfate from the solution of potassium formate so produced and recovering the potassium formate in dry condition by removal of the water of the solution.

10. In the process of claim 9, the improvement which comprises removing residual lime from the solution of potassium formate by an addition of potassium carbonate.

11. In the process of claim 9, the improvement which comprises removing residual lime from the solution by an addition of potassium carbonate and concentrating the solution to a point where residual potassium sulfate will crystallize out prior to recovering dry potassium formate.

12. In the conversion of potassium formate to potassium carbonate by calcination at a high temperature, the process which comprises admixing the formate with sufficient potassium carbonate to form a pasty mixture and subjecting the pasty mixture thus produced to oxidation by air.

13. A process of making potassium carbonate which comprises treating potassium sulfate with gas-containing CO in the presence of water and caustic lime so as to form potassium formate and calcium sulfate, separating potassium formate in solid form and burning it in air to potassium carbonate.

14. The process of claim 9 wherein the dry potassium formate is heated under oxidizing conditions to produce potassium carbonate.

ERICH WIEDBRAUCK.
KARL BÜCHE.